(12) United States Patent
Collings (10) Patent No.: US 6,783,683 B2
(45) Date of Patent: Aug. 31, 2004

(54) STORMWATER POLLUTANT SEPARATION SYSTEM AND METHOD OF STORMWATER MANAGEMENT

(75) Inventor: Patrick X. Collings, Powell, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 0 days.

(21) Appl. No.: 10/237,118

(22) Filed: Sep. 9, 2002

(65) Prior Publication Data

US 2004/0045907 A1 Mar. 11, 2004

(51) Int. Cl.$^7$ ............................................. B01D 21/02
(52) U.S. Cl. ...................... 210/669; 210/688; 210/747; 210/801; 210/170; 210/254; 210/265; 210/305; 210/521; 210/532.1; 210/538
(58) Field of Search ................................. 210/747, 801, 210/804, 170, 256, 299, 305, 521, 532.1, 538, 540, 669, 681, 688, 265, 254

(56) References Cited

U.S. PATENT DOCUMENTS

| | | | | |
|---|---|---|---|---|
| 2,782,929 A | * | 2/1957 | Colket | 210/532.1 |
| 4,422,931 A | * | 12/1983 | Wolde-Michael | 210/532.1 |
| 5,004,537 A | * | 4/1991 | Brown | 210/521 |
| 5,242,584 A | * | 9/1993 | Hoarau | 210/299 |
| 5,266,191 A | * | 11/1993 | Greene et al. | 210/538 |
| 5,433,845 A | * | 7/1995 | Greene et al. | 210/532.1 |
| 5,500,132 A | * | 3/1996 | Elmi | 210/521 |
| 5,746,911 A | | 5/1998 | Pank | |
| 5,759,415 A | | 6/1998 | Adams | |
| 6,077,448 A | * | 6/2000 | Tran-Quoc-Nam et al. | 210/532.1 |
| 6,190,545 B1 | * | 2/2001 | Williamson | 210/521 |
| 6,350,374 B1 | * | 2/2002 | Stever et al. | 210/532.1 |
| 2001/0013489 A1 | * | 8/2001 | Williamson | 210/153 |

* cited by examiner

Primary Examiner—Christopher Upton
(74) Attorney, Agent, or Firm—Kremblas, Foster Phillips & Pollick (57) ABSTRACT

A stormwater pollutant separator system is provided with the system having a stormwater pollutant separator, a by-pass system, an intake conduit and an outflow conduit connected together. The stormwater pollutant separator includes a chamber with a weir plate and siphon plate therein. The chamber has first, second, and third sections. The first section is located between the chamber first end and the weir plate. The second section is located between the weir plate and siphon plate. The third section is located between the siphon plate and the chamber second end. In one embodiment the third section has filter material placed intermediate the siphon (sometimes referred to as the second weir) plate and the second end plate. A method for separating material and pollutants from stormwater drainage is also disclosed with the method including the steps of inducing the stormwater drainage initially into a stormwater pollutant separator, containing the majority of all non-floating and floating material by the use of the weir plate and siphon plate respectively, discharging the stormwater drainage therefrom, providing a by-pass system for introduction of stormwater drainage overflow thereinto, and combining all the discharging stormwater drainage together.

22 Claims, 3 Drawing Sheets

STORMWATER POLLUTANT SEPARATION SYSTEM AND METHOD OF STORMWATER MANAGEMENT

FIELD OF THE INVENTION

The present invention relates generally to stormwater management, and more particularly, to a stormwater pollutant separation system and its method of use, and even more particularly to a component of that system, a stormwater pollutant separator.

BACKGROUND OF THE INVENTION

This invention is directed to the providing of a pollutant separation system for use in stormwater management. Historically, stormwater management has been primarily concerned with the control of erosion and sedimentation during and as a result of construction, and with the control of discharge from a site following construction so that the amount of discharge was either the same or less than under pre-developed conditions. The former concern addressed water quality during construction, while the latter concern prevented downstream flooding from the change in land use. However, neither concern considered how post-development water quality was impacted.

However, beginning in 1972, the importance of water quality and the impact of construction on natural streams and watercourses was recognized and federally regulated. For example, the Clean Water Act allowed for federal regulation of construction activities to insure the impact on water quality was minimized. Inlet protection, channel liners, vegetation, seeding and sodding, silt fences and sediment ponds all became associated with construction activity. Any construction activity which disturbed five or more acres required permitting to insure proper erosion control methods were utilized during construction.

Subsequently, most state and local communities have enacted legislation requiring all construction projects to incorporate some level of erosion and sediment control during construction. Today therefore it is common practice to incorporate a variety of erosion and sediment control devices and techniques in connection with construction projects.

As beneficial as legislation directed to erosion control of stormwater was, the nation's water quality continued to decline. Therefore, in 1999 the Phase II Clean Water Act was enacted. Each municipality covered by the Act is required to demonstrate Best Management Practices (BMP) in a number of areas, one of which concerns post-construction runoff controls. One of the areas requires that regulated municipalities have a program that reduces pollutants for new and redevelopment projects. In connection with new construction, the possible BMPs include watertight pipes, retention/detention systems, inlet control devices, and water quality units for stormwater.

One particular area of concern is runoff from new construction, particularly parking lots. In fact, some studies have found that the largest source of pollutants at the current time being discharged into receiving waters is from stormwater runoff. Thus, there is considerable interest in trying to decrease the amount of sediment, oil, grease, and other contaminants being discharged into streams, rivers, and other bodies of water. Stormwater pollutant separation systems have been developed for installation below grade as part of the stormwater drainage system.

These systems have been designed to accommodate and treat the stormwater associated with two very important and distinct time periods. The first time period is known in the industry as "first flush". This term is used to describe the design discharge to be treated. Although local definitions vary, typical first flush designs are the first ½" to 1" rainfall for a 6 to 12 month return period. This stormwater runoff occurs near the beginning of a storm when the amount of precipitation becomes sufficient to cause the dirt and oil on the surface of a parking lot, by way of example, to flow into the drainage grates and enter the stormwater drainage system.

The other time period occurs when a storm is strong enough to cause a large volume of water to enter the stormwater drainage system. This large volume of water requires that the rate of ingress through the system attempt to avoid back-up and actual preclusion of some water from being able to enter the storm grate, thereby causing surface flooding.

As important as it is to address the problem of oil in runoff, there are two additional areas of concern. The first area concerns heavy metal pollutants. Lead from automotive brake pads, cadmium and nickel from combustion due to normal engine wear, and zinc from the galvanizing of automotive parts' coatings all make their way into stormwater runoff. The second area concerns phosphates and nitrates commonly introduced into stormwater runoff as a consequence of their use in fertilizer which may have been applied to grass, flowers, shrubs, and trees.

There have been several attempts at providing stormwater pollutant separation systems. For example, Pank, U.S. Pat. No. 5,746,911, discloses an apparatus for separating a light from a heavy fluid, such as occurs as between oil and water from parking lot run-off. The system utilizes two large tanks connected to each other by a pair of conduits. Under most conditions, water flow enters the inlet tank, flows into the separation tank, and then finally flows from the separation tank to the outlet conduit. However, when the system is subjected to a heavy rain, the fluid level in the inlet tank rises to a level at which there is a direct overflow into the outlet conduit.

Adams, U.S. Pat. No. 5,759,415, discloses a method and apparatus for separating floating and non-floating particulate from rainwater drainage. A particulate container chamber is utilized, and an embodiment for separating oil is shown in FIG. 12, with a separate oil/water separator being coupled to the tank of the invention. In the embodiment of that invention as marketed by Vortechnics, Inc. of Portland, Me., the system is fabricated near the jobsite from pre-cast concrete and marine grade aluminum. Unlike Pank, even in heavy rain conditions the path of flow through the Adams apparatus remains virtually the same. Moreover, in the apparatus of Adams as in Pank, the input flow equals the output flow, such that there is no way to control the velocity of the liquid passing through either system.

However, the potential exists with either system to partially flush captured contaminants, especially under heavy rain conditions. Additionally, the fact that all input flow must pass into the inlet tank or area before entering the outlet conduit creates the possibility of backup unless the system is made relatively large, which adversely impacts on price and size considerations.

It is thus apparent that the need exists for a stormwater pollutant separation system which can control the velocity of the fluid passing through the system while at the same time prevent the flushing of captured pollutants, including heavy metals, phosphates, and nitrates.

SUMMARY OF THE INVENTION

In accordance with this invention a stormwater pollutant separator system is provided with the system having a stormwater pollutant separator, a by-pass system, an intake conduit and an outflow conduit. The stormwater pollutant separator has a chamber having a first end and a second end, a top and a bottom. A weir plate is attached to and extends upwardly from the chamber bottom. A siphon plate is attached to and extends downwardly from the chamber top.

A plurality of inspection/maintenance risers are attached to and extend upwardly from the stormwater pollutant separator. The first end of the chamber of the stormwater pollutant separator has an intake aperture formed therein. Similarly, the second end has an outflow aperture formed therein.

The by-pass system has a first end and a second end, with the intake conduit connecting the first end of the stormwater pollutant separator and the first end of the by-pass system, and with the outflow conduit connecting the second end of the stormwater pollutant separator and the second end of the by-pass system.

The chamber of the stormwater pollutant separator system has a first section, a second section, and a third section. The first section is located between the first end of the chamber and the weir plate. The second section is located between the weir plate and the siphon plate. The third section is located between the siphon plate and the second end of the chamber.

The first section preferably has an inspection/maintenance riser connected thereto which extends upwardly therefrom. The second section preferably has an inspection/maintenance riser connected thereto which extends upwardly therefrom. The third section in at least one embodiment has an inspection/maintenance riser connected thereto which extends upwardly therefrom. In that embodiment the third section has the potential for having filter material placed intermediate the siphon plate and the second end plate, with the filter material being adjacent the outflow aperture.

In that embodiment the third section preferably has a standpipe having a top and a bottom, with the standpipe top attached to and extending downwardly from the chamber top. The standpipe has a plurality of apertures formed therein below the outlet aperture, with the filter material being located within the interior of the standpipe. In at least one embodiment, the standpipe has an end plate attached at the standpipe bottom, and at least in one embodiment the standpipe end plate has apertures formed therein.

The chamber preferably includes a stiffener plate attached to and extending inwardly from the first end of the chamber, and a dispersion baffle having a top and a bottom, with the baffle top attached to the chamber top and the baffle bottom attached to the stiffener plate.

The intake conduit features a connector having an upwardly extending portion and a downwardly extending portion, with the upwardly extending portion preferably having an inspection/maintenance riser, and with the downwardly extending portion being connected to at least one piece of conduit also connected to the stormwater pollutant separator. The by-pass system includes a by-pass conduit and a by-pass connector, with the by-pass connector attached to the by-pass conduit and to the outflow conduit.

There is also disclosed a stormwater pollutant separator having a chamber and a plurality of inspection/maintenance risers. The chamber has a top and a bottom, and a first end and a second end. The first end of the chamber of the stormwater pollutant separator has an intake aperture formed therein, and the second end has an outflow aperture formed therein. A weir plate is attached to and extends upwardly from the chamber bottom, while a siphon plate is attached to and extends downwardly from the chamber top. The inspection/maintenance risers are attached to and extend upwardly from the stormwater pollutant separator.

The stormwater pollutant separator chamber features a first section, a second section, and a third section, with the first section being located between the first end and the weir plate, the second section being located between the weir plate and the siphon plate, and the third section being located between the siphon plate and the second end. The first section has one of the inspection/maintenance risers connected thereto and extending upwardly therefrom. Similarly, the second section has one of the inspection/maintenance risers connected thereto and extending upwardly therefrom. Preferably, the third section has one of the inspection/maintenance risers connected thereto and extending upwardly therefrom. Preferably, the third section has filter material placed intermediate the siphon plate and the second end plate, with the filter material being adjacent the outflow aperture.

Preferably, the third section has a standpipe, with the standpipe having a top and a bottom, and with the standpipe top attached to and extending downwardly from the chamber top. The standpipe has a plurality of apertures formed therein. The filter material is placed within the interior of the standpipe. The optional standpipe has an end plate attached at the standpipe bottom, and preferably the standpipe end plate has apertures formed therein.

The stormwater pollutant separator chamber preferably includes a stiffener plate attached to and extending inwardly from the first end, as well as a dispersion baffle having a top and a bottom. The baffle top is attached to the chamber top and the baffle bottom is attached to the stiffener plate.

There is also disclosed a method for separating floating and non-floating material from stormwater drainage, with the method including the steps of inducing the stormwater drainage initially into a stormwater pollutant separator for flow therethrough, containing the majority of all non-floating material by the use of a weir plate within the stormwater pollution separator, containing the majority of all floating material by the use of a siphon plate within the stormwater pollution separator, discharging the stormwater drainage from the stormwater pollutant separator, providing a by-pass system for introduction of stormwater drainage thereinto for flow therethrough when the level of stormwater drainage awaiting introduction into the stormwater pollutant separator results in overflow into the by-pass system, and discharging any stormwater drainage from the by-pass system into the stormwater drainage discharged from the stormwater pollutant separator.

The method includes the additional step of removing some of the suspended solids in the stormwater drainage, in particular, heavy metals, phosphates, and nitrates, by introducing a filtering material within the stormwater pollutant separator prior to the discharge of the stormwater drainage from the stormwater pollutant separator. The stormwater pollutant separator has an outlet aperture sized to regulate the rate of flow of the stormwater drainage through the stormwater pollutant separator. The stormwater pollutant separator also has an intake aperture through which the stormwater drainage is introduced into the stormwater pollution separator, with the stormwater pollution separator preferably having a dispersion baffle located adjacent the intake aperture.

The primary objective of this invention is to provide a stormwater pollutant separation system which can control the velocity of the fluid passing through the system while at the same time prevent the flushing of captured pollutants, including sediment, hydrocarbons, and suspended solids such as heavy metals, phosphates, and nitrates. An important aspect of this objective is the providing of a unique stormwater pollutant separator which can separate sediment, floating material and suspended solids including heavy metals, phosphates, and nitrates.

Another objective is to provide a stormwater pollutant separation system that can control both flow and peak flow. An important aspect of this is the providing of a by-pass system that works in conjunction with the stormwater pollutant separator.

Another objective is to provide a stormwater pollutant separation system that is of relatively economical construction and is relatively easy to fabricate.

Still another objective is to provide a stormwater pollutant separation system that can be installed on site relatively easily.

Yet still another objective is to provide a method for use of the system of this invention.

Other objects and advantages of the invention will be apparent from the following description, the accompanying drawings, and the appended claims.

DETAILED DESCRIPTION OF THE DRAWINGS

Figure 1:
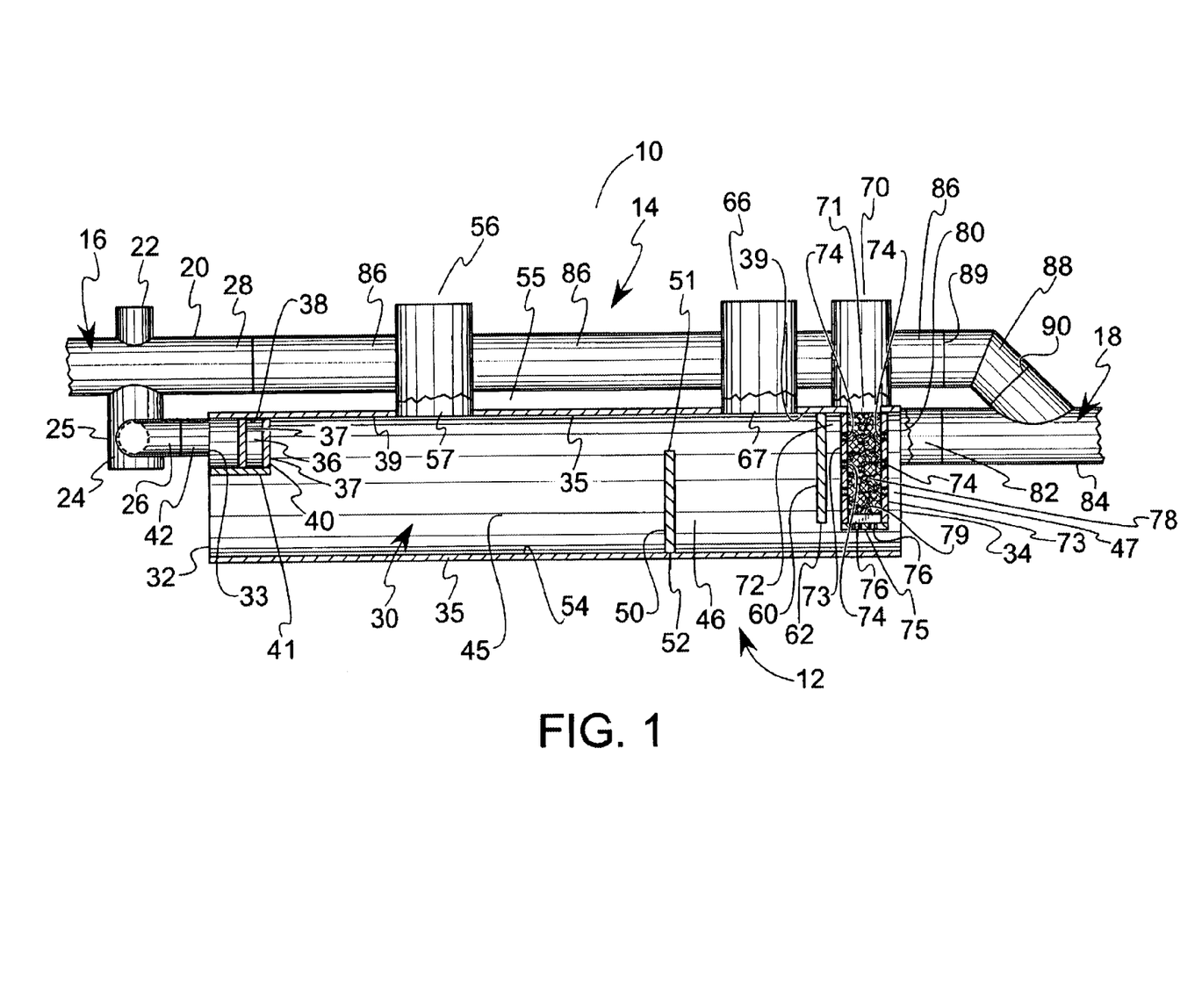
FIG. 1 is a partially exploded side elevational view of a stormwater pollutant separation system made in accordance with the present invention.

Having reference to the drawings, attention is directed first to FIG. 1 which discloses a stormwater pollutant separation system designated generally by the numeral 10, made in accordance with the present invention. The stormwater pollutant separator system includes as its major components a stormwater pollutant separator 12, a by-pass system 14, an intake conduit 16, and an outflow conduit 18.

Under most conditions, the intake conduit 16 includes a tee connector 20 as shown in FIG. 1. Such a tee connector optionally may have a tee riser 22 rising upwardly above that portion of the tee connector through which stormwater drainage is introduced to the stormwater pollutant separator system of this invention, and has a downwardly depending portion 24 extending downwardly from that portion of the tee connector through which stormwater drainage is introduced to the stormwater pollutant separator system of this invention.

The downwardly depending portion 24 has a downwardly depending sidewall 25. Additionally, there is a connecting conduit 26 with at least its proximal end attached to the downwardly depending portion 24, with this bend 26 extending towards the stormwater pollutant separator 12. The intake conduit 16 also includes a by-pass connecting end 28 which connects the intake conduit 16 to the by-pass system 14, at the proximal end of the by-pass system. The optional inclusion of tee riser 22 facilitates the cleaning out of the by-pass system 14.

Figure 2:
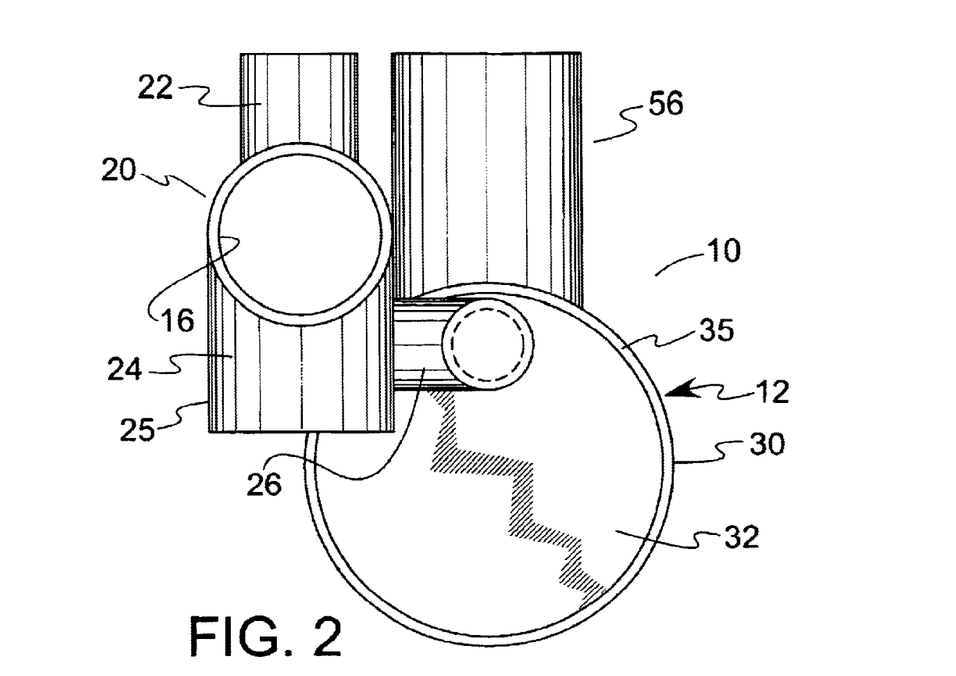
FIG. 2 is an end plan view taken from the left side of FIG. 1.

With respect to all the conduit and couplings used in the invention, they preferably are fabricated from HDPE, or other structural material having similar characteristics such as, but not limited to, PE metal, polypropylene, or PVC. With respect to the specific physical dimensions of an embodiment of a system utilizing this invention, it must be appreciated that based on the flow requirements of a specific system, one of ordinary skill in the art in the design of these systems would then dimension the system to be designed accordingly. In the embodiment of the invention shown in FIGS. 1 and 2, the intake conduit is comprised of a 24" diameter tee connector having an 18" high riser. The downwardly depending portion extends downwardly 18" as well, with the bend 26 being a 90° bend of 12" diameter pipe welded into the sidewall 25 of the tee connector 20. The length of the portion of the bend 26 shown in FIG. 2 is approximately 20". Similarly, the length of the portion of the bend 26 shown in FIG. 2 is approximately 20". The length of that portion of the tee connector from the center of the tee connector to the by-pass connecting end 28 is approximately 41".

The stormwater pollutant separator 12 includes a chamber 30 having a chamber first end plate 32 with an intake aperture 33 formed therein, and a chamber second end plate 34 at the opposite end of the chamber from the first end plate 32. The chamber 30, which is shown as being cylindrical, also has a chamber sidewall 35 which extends from the first end plate 32 to the second end plate 34, and although chamber 30 is shown as a single unitary structure, it should be understood that depending primarily on overall length, the chamber could be formed by a cooperating combination of pipes.

Figure 3:
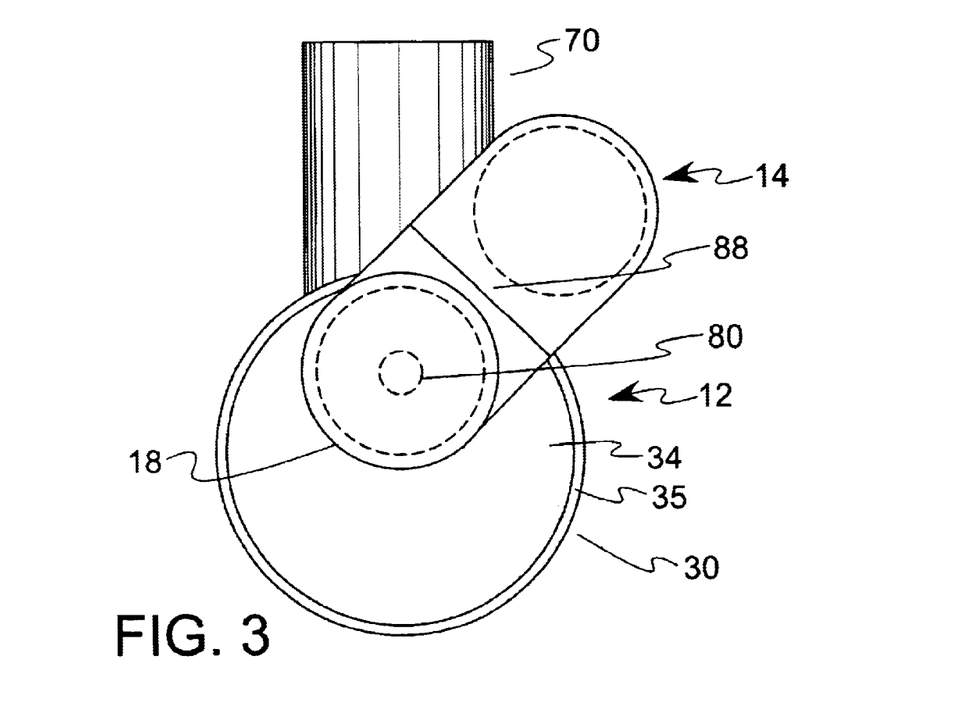
FIG. 3 is an end plan view taken from the right side of FIG. 1.

In the embodiment of the invention shown in FIGS. 1–3, each of the end plates is fabricated from ½" thick HDPE plate. The chamber sidewall is made from profile walled pipe about 3" thick, with the chamber itself being approximately 22' long and 48" in diameter.

Located inwardly from the intake aperture 33 is a dispersion baffle 36, the function of which is to split the intake flow as it enters the chamber 30 from the downwardly depending portion 24 of the intake conduit 16. The dispersion baffle 36 associated with this invention has a top 38 and a bottom 40, and is shown as being formed from a section of plastic pipe, such that there is a dispersion baffle sidewall 37 attached to the interior upper surface 39 of the chamber sidewall 35 at the top of the dispersion baffle 36. The bottom of the dispersion baffle 36 is attached to a stiffener plate 41.

In the embodiment of the invention shown in FIG. 1, the dispersion baffle 36 is fabricated from an 8" diameter pipe, preferably of HDPE. The distance from the dispersion baffle first end 38 to the dispersion baffle second end 40 is 16". The dispersion baffle 36 is attached to the chamber so that the dispersion baffle sidewall 37 is spaced 12" from the chamber first end plate 32. The stiffener plate 41, preferably made of HDPE, is approximately 20" long and extends from the first end plate to the most inwardly located sidewall of the dispersion baffle. The purpose of the stiffener plate is to provide an additional point of attachment for the dispersion baffle. The intake aperture 33 is approximately 12" in diameter, and is located immediately beneath the chamber interior upper surface 39.

Figure 4:
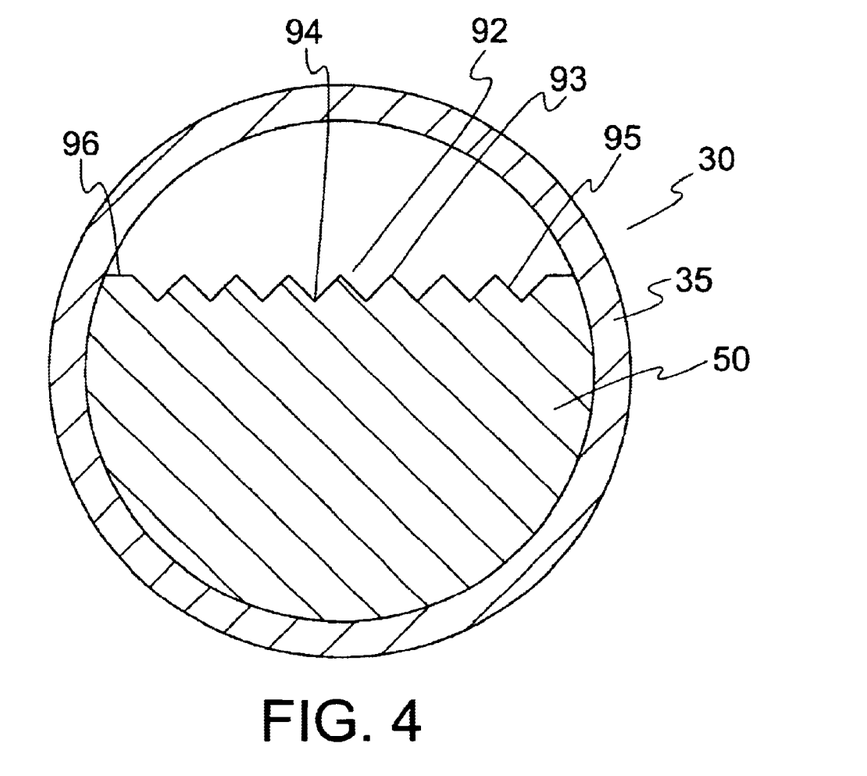
FIG. 4 is a vertical sectional view taken on a greatly enlarged scale of the weir plate shown in FIG. 1.

Thus, it will be appreciated from FIG. 1, that the chamber is effectively divided into a chamber first section 45, a chamber second section 46, and a chamber third section 47. The chamber first section is approximately 160" (13.3 ft) long as will be appreciated from the calculation of this value based on the specific design parameters discussed below in connection with a hypothetical system. Once the length of the chamber first section is calculated, the length of the chamber second section is approximately half that length, such that the length of the chamber second section in the hypothetical system is approximately 80" long. The length of the chamber third section is large enough to accommodate the diameter of the standpipe, which in the example is about 24", such that the length of the third section in the example is approximately 36" long in the specific embodiment of the invention shown in FIG. 1. The chamber first and second sections are separated by a weir plate 50 having a top 51 and a bottom 52, with the weir plate bottom 52 attached to the chamber interior lower surface 54. The weir plate is preferably fabricated from ½" thick plate, preferably plastic or more particularly HDPE, and in the specific embodiment shown in FIGS. 1 and 4 is approximately 35½" tall, which is a dimension based on the diameter of the chamber 30.

Extending upwardly from the top 55 of the chamber located above the chamber first section 45 is a first access riser 56, although the term inspection/maintenance riser is also used, with first access riser aperture 57 formed in the sidewall of the chamber 30. As stormwater drainage flows into the chamber first portion, the weir plate collects the majority of the sediment typically found as non-floating particulate or non-floating pollutant material in stormwater.

Figure 5:
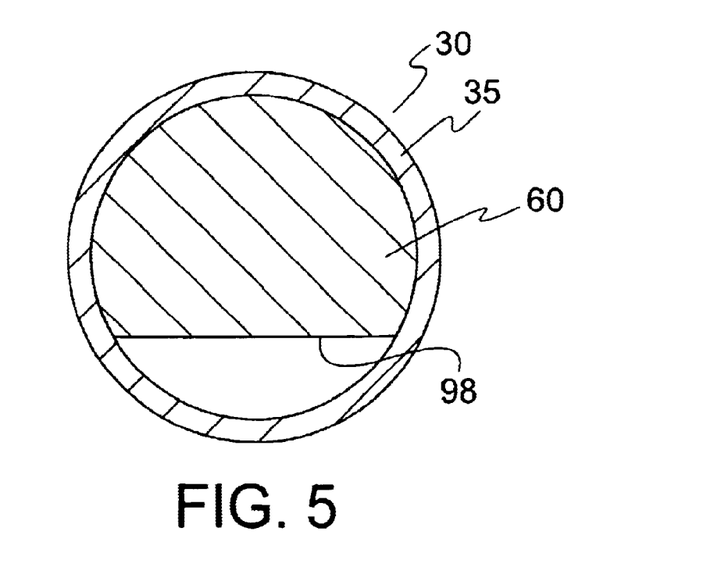
FIG. 5 is a vertical sectional view taken on an enlarged scale of the siphon plate shown in FIG. 1.

The chamber second and third sections, 46 and 47 respectively, are separated by a siphon plate 60 having a top 61 and a bottom 62, with the siphon plate top 61 attached to the chamber interior top surface 39. The siphon plate is preferably fabricated from ½" thick plate, preferably plastic or more particularly HDPE, and in the specific embodiment shown in FIGS. 1 and 5 is approximately 35½" tall, which is a dimension based on the diameter of the chamber 30.

Extending upwardly from the top 55 of the chamber located above the chamber second section 46 is a second access riser 66, although the term inspection/maintenance riser is also used, with second inspection/maintenance riser aperture 67 formed in the sidewall of the chamber 30. As stormwater drainage flows into the chamber second portion 46 from the sediment chamber 45, the siphon plate 60 collects the majority of the floating particulate or floating pollutant material in stormwater. One important type of floating pollutant contained by the siphon plate 60 is petroleum, since petroleum waste, whether gasoline or oil, will float on water. In the specific embodiment of the invention shown in the drawings, both the first and second inspection/maintenance risers are 24" diameter pipe, 3' tall, welded to the chamber.

The embodiment of the invention which can also contain heavy metals, phosphates, and nitrates is actually shown in FIG. 1. By comparing FIGS. 1 and 3, it will be appreciated that the chamber third section 47 has associated therewith a third access riser 70, although the term inspection/maintenance riser is also used. Extending upwardly from the top 55 of the chamber located above the chamber third section 47 is a third inspection/maintenance riser 70, with third inspection/maintenance riser aperture 71 formed in the sidewall of the chamber 30.

As stormwater flows from the second section 46 into the third section 47, it comes into contact with a filter material 78. This filter material 78 is of the type well known in the art as being capable of capturing or precipitating heavy metals, phosphates, and nitrates. One such type of filter is a treated sponge material that comes in cubes and is treated to attract heavy metals, phosphates, and nitrates. The filter material 78 can be encased in a geotextile fabric sheath 79 also referred to as a sock. While it is possible for the filter material to be suspended from the top 55 into the third section, preferably a standpipe 72 is provided.

Since the embodiment shown features the optional standpipe 72, the specific embodiment shown as being designed for, features a standpipe that is fabricated from a 18" diameter pipe attached, preferably by welding, to chamber top 55. The standpipe in the specific embodiment shown in FIG. 1 is approximately 36" tall. To facilitate interaction between the filter material 78 and the stormwater drainage, the standpipe 72 has a sidewall 73 with a plurality of standpipe apertures 74 formed therein. These standpipe apertures are located below the outlet aperture to insure contact with the filter material when used. To prevent the filter material from accidentally dropping out of the standpipe 72, a standpipe end plate 75 is attached at the bottom of the standpipe. The end plate 75 also preferably has a plurality of standpipe end plate apertures 76 formed therein. While the standpipe and filter material are not required for stormwater pollutant separation per se, they are advantageous for removal of heavy metals, phosphates, and nitrates, and would be included in the most preferred embodiment of the inventive system.

The stormwater drainage after passing through the chamber third section 47 exits from the chamber 30 via outflow aperture 80 formed at the top of chamber second end plate 34. In the embodiment shown in FIGS. 1 and 3, it will be appreciated that the outflow orifice, also termed the outlet aperture, 80 is 6" in diameter. Attached to the exterior of the second end plate, preferably by welding, is outflow connector 82, which in the embodiment shown is a 24" diameter pipe approximately 16" long. The outflow connector 82 has its other end attached to a wye connector 84, which in the embodiment shown is a 24" diameter connector.

The by-pass system 14 includes a by-pass conduit 86, with this by-pass pipe 86 in the specific embodiment of the invention shown in FIG. 1 being approximately 236" long. The by-pass system of the invention also includes a bend 88, which in the embodiment shown is a 45° bend coupler, having a first end 89 attached to the by-pass pipe, and a second end 90 attached to the wye connector 84. Both the by-pass conduit and the bend are 24" in diameter, and it will be appreciated that the exact lengths of each of the leg portions of the bend will need to have their length adjusted to provide a secure attachment of the various conduit components.

Returning now to a further discussion of the structure of the weir plate and siphon plate, it will be appreciated from a comparison of FIGS. 1, 4, and 5 that the weir plate 50 preferably has a serrated top edge 92, with points 93 and valleys 94. The serrations serve to provide a more quiescent flow of the stormwater drainage as it passes from the first to the second chamber section, 45 and 46 respectively. Each serration includes inclined surfaces 95, with end sections 96 being provided at each end of the top edge 92 where the weir plate 50 attaches to the chamber sidewall 35. Similarly, siphon plate 60 has a generally horizontal bottom edge 98.

In discussing dimensions associated with a specific embodiment of the invention, it should be appreciated that the embodiment of the invention disclosed in FIG. 1 and referred to when specific dimensions were cited is a system designed to have a treatment flow of 1.29 CFS. Using the first flush discharge, sediment chamber velocity (fps) is calculated as the first flush discharge divided by the cross sectional area of the sediment chamber ($ft^2$). The cross sectional area of the sediment chamber is appropriate, provided that the inlet pipe diameter is at least ⅙ the sediment chamber diameter and the sediment chamber length is at least 3 times the difference between the sediment chamber diameter and the inlet pipe diameter. This allows for the full expansion of the inlet flow. The deflector plates at the inlet are used to ensure full expansion of inlet flow through the full range of design flows.

Once the chamber velocity and settling time are known, the length of the sediment chamber (ft) is the product of sediment chamber velocity and settling time. Control of treating the first flush is accomplished using an outlet orifice. The orifice is designed to a head pressure equal to the settling distance plus 2" for the first flush discharge. The 2" drop across the sediment chamber weir is added to prevent backwash of captured oils. Sizing the orifice for the first flush will cause the system to surcharge and by-pass flows in excess of the first flush.

Furthermore, the system of this invention is designed using the fundamental principles of Stokes' Law and a standard orifice equation. Using Stokes' Law it is possible to calculate the settling velocity of a particle, which is to captured in the sediment chamber. The particle size should be selected as the smallest particle size to be removed. The settling distance (ft) is designed as the vertical drop from the inlet to the sediment chamber weir. Knowing the settling distance and settling velocity, the settling time (sec) is the settling distance divided by the settling velocity.

Using Stokes' Law to find the settling velocity of a specific known particle size:

$V_{settling} = 2*g*r^2*[(\gamma_1-\gamma_2)/(9*\mu)]$ $V_{settling}$=Velocity of fall for a particle (cm/sec)

g=Acceleration of gravity (cm/sec$^2$)=981.5 cm/sec$^2$ $r$ = Equivalent radius of particle (cm)

= 0.00375 cm for 200 sieve $\gamma_1$=Density of particle (gm/cm$^3$)=1.9 (g/cm$^3$) (soil)

$\gamma_2$=Density of medium (g/cm$^3$)=1.0 (g/cm$^3$) (water)

$\mu$ = Viscosity of medium (dyne-sec/cm$^2$)

= 0.01002 dyne-sec/cm$^2$ (water at 20° C.)

$V_{settling} = 2*981.5*0.00375^2*[(1.9-1.0)/(9*0.01002)]$

= 0.275 cm/sec = 0.009 ft/sec

The weir plate can then be positioned to capture the sediment, realizing of course that the location will be dependent on particle size, and thus variable. The distance from the top of the chamber to the valley of the weir plate is the settling distance. The intake connector invert is set at the same elevation as the tooth of the weir plate. A particle must fall a distance equal to the inlet connector diameter+2" (the vertical distance between the tooth and valley of the weir plate). This distance is called the settling distance. Knowing the settling velocity and the distance it must fall to be captured in the sediment chamber 45, it is possible to calculate the time it will take a particle to settle this distance. The settling time can be calculated as follows (with the value calculated below being based on the previous calculation, which is turn was based on a hypothetical situation):

$T_{settling}$=SD/$V_{settling}$ $T_{settling}$=Settling time for a known particle size (sec)

SD=Settling distance=inlet pipe diameter+2" (ft)

$V_{settling}$=Settling velocity (ft/sec)

$T_{settling}$=1.17/0.009=129.5 sec

It is then necessary to compute the velocity at which fluid (i.e. stormwater) travels through the first chamber, which equates to the flow that the system is designed to treat divided by the cross sectional area of the stormwater pollutant separator. Again, based on the hypothetical situation:

$V_{SC}=Q_{treat}/A_{WQU}$ $V_{SC}$=Velocity through the sediment chamber (ft/sec)

$Q_{treat}$=Flow at which one wants to treat for water quality (CFS)

$A_{WQU}$=Cross-sectional area of the water quality unit (i.e. Stormwater pollutant separator) (ft$^2$)

$V_{SC}$=1.29/[$(\pi/4)*4$]=0.1026 ft/sec (48" WQU)

Taking the velocity through the sediment chamber and multiplying it by the settling time of the particle will permit determination of the length of the sediment chamber. The length of the sediment chamber in this specific hypothetical can be calculated as follows:

$L_{sediment}=V_{SC}*T_{settling}$ $L_{sediment}$=Length of sediment chamber (ft)

$V_{SC}$=Velocity through the sediment chamber (ft/sec)

$T_{settling}$=Settling time for a known particle size (sec)

$L_{sediment}$=0.1026*129.5=13.3 ft

Finally, an outlet orifice needs to be sized which will permit the stormwater pollutant separator to go into by-pass once the required flow, $Q_{treat}$, is reached. The diameter of the outflow aperture in the hypothetical can be calculated as follows:

$Q_{treat}=Cd*A_0*(2*g*h_0)^{1/2}$ $Q_{treat}$=Flow which is being treated (CFS)

Cd=Coefficient=0.8

$A_0$=Area of the orifice=$(\pi/4)*d_0^2$ (ft$^2$)

g=Acceleration of gravity (ft/sec$^2$)=32.2 ft/sec$^2$ $h_0$=Head pressure (ft)=SD Solving the equation for the diameter of the orifice, $d_0$, it can be determined that:

$d_0=[(4*Q_{treat})/(0.8*\pi*(2*g*h_0)^{1/2})]^{1/2}$

The invert of the outlet orifice is placed below the invert of the inlet pipe to keep oils from backing up into the sediment chamber. Thus the distance the outlet aperture is placed below the invert of the inlet is typically 2". Therefore, in the specific embodiment disclosed with respect to FIG. 1, namely a system designed to treat a 1.29 CFS flow:

$d_0=[(4*1.29)/(0.8*\pi*(2*32.2*1.17)^{1/2})]^{1/2}$=0.48 ft

Therefore a 6" outlet orifice is used.

From the above calculations, it will be readily appreciated that the flow through the system of the invention is controlled by the size of the outlet orifice. The system of this invention thus is able to control flow as well as peak flow. In designing for energy head, the important factors to consider are making sure that the outlet orifice size allows the proper flow in cubic feet per second (CFS), the height at the bottom of the by-pass pipe, and the height at the bottom of the outlet orifice. While head (h) is equal to the differential in energy between the invert of the flow line for the stormwater (velocity head)(i.e. the bottom of the outlet orifice) and the height of the water from the top to the bottom of the stormwater pollutant separator (static head). Meanwhile energy head equals h+(v$^2$/2g), where v is the flow velocity and g is a constant, the acceleration of gravity.

Using this stormwater pollutant separator system permits utilization of a method for separating floating and non-floating material from stormwater drainage. Using any well known hydraulic conduit systems the stormwater drainage initially passes through the intake conduit and enters into a stormwater pollutant separator for flow therethrough. The majority of all non-floating material is contained within the chamber first section by the use of a weir plate within the stormwater pollution separator. The flow which passes over the weir plate then has the majority of all floating material contained by the use of a siphon plate within the stormwater pollution separator. The stormwater drainage can then be discharged from the stormwater pollutant separator into the outflow conduit, although in the preferred embodiment of the method, the method includes the additional step of containing the majority of all heavy metals, phosphates, and nitrates in the stormwater drainage by introducing a filtering material within the stormwater pollutant separator prior to the discharge of the stormwater drainage from the stormwater pollutant separator.

The stormwater pollutant separator has an outlet aperture sized to regulate the rate of flow of the stormwater drainage through the stormwater pollutant separator. The stormwater pollutant separator also has an intake aperture through which the stormwater drainage is introduced into the stormwater pollution separator, with the stormwater pollution separator preferably having a dispersion baffle located adjacent the intake aperture to split the initial flow of the stormwater as it enters the stormwater pollutant separator.

A by-pass system is also provided for introduction of stormwater drainage thereinto for flow therethrough when the level of stormwater drainage awaiting introduction into the stormwater pollutant separator results in overflow into the by-pass system. Any stormwater drainage which flows through the by-pass system is discharged from the by-pass system into the outflow conduit where it flows into the stormwater drainage discharged from the stormwater pollutant separator.

As a result of the characteristics of the structure of the invention, a stormwater pollutant separation system is provided which can control the velocity of the fluid passing through the system while at the same time prevent the flushing of captured pollutants, including heavy metals, phosphates, and nitrates. This is due in part to the stormwater pollutant separator which can separate sediment, floating material and heavy metals, phosphates, and nitrates.

The stormwater pollutant separation system of this invention can control both flow and peak flow. An important aspect of this is the providing of a by-pass system that works in conjunction with the stormwater pollutant separator. Moreover, the stormwater pollutant separation system is of relatively economical construction and is relatively easy to fabricate. Additionally, the stormwater pollutant separation system can be installed on site relatively easily. In use, the system of this invention effectively and efficiently removes several types of pollutants. The system can be cleaned periodically due to the presence of the inspection/maintenance risers. Each of the risers can have concrete housings and manhole covers installed at their tops in the manner well known in the art.

While the form of apparatus and method herein described constitutes a preferred embodiment of this invention, it is to be understood that the invention is not limited to this precise form of apparatus or method and that changes may be made therein without departing from the scope of the invention which is defined in the appended claims.

What is claimed is:

1. A stormwater pollutant separator system, comprising
    a stormwater pollutant separator having a first end and a second end, said stormwater pollutant separator comprising a chamber, said chamber having a top and a bottom, a weir plate attached to and extending upwardly from said chamber bottom, said weir plate extending completely across said chamber at a height less than the height of said chamber, a siphon plate attached to and extending downwardly from said chamber top, a plurality of access risers attached to and extending upwardly from said stormwater pollutant separator, said first end having an intake aperture formed therein, said second end having an outflow aperture formed therein, filter material being inside said chamber adjacent said outflow aperture, said filter material filtering out heavy metals,
    a by-pass system having a first end and a second end,
    an intake conduit connecting said first end of said stormwater pollutant separator and said first end of said by-pass system, and
    an outflow conduit connecting said second end of said stormwater pollutant separator and said second end of said by-pass system.

2. The stormwater pollutant separator system according to claim 1 wherein said chamber comprises a first section, a second section, and a third section, said first section being located between said first end and said weir plate, said second section being located between said weir plate and said siphon plate, said third section being located between said siphon plate and said second end, said first section being of a length greater than the length of said second section.

3. The stormwater pollutant separator system according to claim 2 wherein said first section has an inspection/maintenance riser connected thereto and extending upwardly therefrom, and said second section has an inspection/maintenance riser connected thereto and extending upwardly therefrom.

4. The stormwater pollutant separator system according to claim 3 wherein said third section has an inspection/maintenance riser connected thereto and extending upwardly therefrom, said third section having filter material placed intermediate said siphon plate and said second end, said filter material being adjacent said outflow aperture.

5. The stormwater pollutant separator system according to claim 1 wherein said intake conduit comprises a connector having an upwardly extending portion and a downwardly extending portion, said upwardly extending portion comprising an inspection/maintenance riser, said downwardly extending portion being connected to at least one piece of conduit also connected to said stormwater pollutant separator.

6. The stormwater pollutant separator system according to claim 1 wherein said by-pass system includes a by-pass conduit and a by-pass connector, said by-pass connector attached to said by-pass conduit and to said outflow conduit.

7. A stormwater pollutant separator system, comprising
    a stormwater pollutant separator having a first end and a second end, said stormwater pollutant separator comprising a chamber, said chamber having a top and a bottom, a weir plate attached to and extending upwardly from said chamber bottom, a siphon plate attached to and extending downwardly from said chamber top, a plurality of access risers attached to and extending upwardly from said stormwater pollutant separator, said first end having an intake aperture formed therein, said second end having an outflow aperture formed therein, said chamber comprising a first section, a second section, and a third section, said first section being located between said first end and said weir plate, said second section being located between said weir plate and said siphon plate, said third section being located between said siphon plate and said second end, said first section having an inspection/maintenance riser connected thereto and extending upwardly therefrom, said second section having an inspection/maintenance riser connected thereto and extending upwardly therefrom, and said third section having an inspection/maintenance riser connected thereto and extending upwardly therefrom, said third section having filter material placed intermediate said siphon plate and said second end, said filter material being adjacent said outflow aperture, a by-pass system having a first end and a second end, an intake conduit connecting said first end of said stormwater pollutant separator and said first end of said by-pass system, and an outflow conduit connecting said second end of said stormwater pollutant separator and said second end of said by-pass system, said third section having a standpipe, said standpipe having a top and a bottom, said standpipe top attached to and extending downwardly from said chamber top, said standpipe having a plurality of apertures formed therein said filter material placed within said standpipe.

8. The stormwater pollutant separator system according to claim 7 wherein said standpipe has an end plate attached at said standpipe bottom, said standpipe end plate having apertures formed therein.

9. A stormwater pollutant separator comprising a chamber, said chamber having a top and a bottom, a first end and a second end, said first end having an intake aperture formed therein, said second end having an outflow aperture formed therein, a weir plate attached to and extending upwardly from said chamber bottom, said weir plate extending completely across said chamber at a height less than the height of said chamber, a siphon plate attached to and extending downwardly from said chamber top, filter material being inside said chamber adjacent said outflow aperture, said filter material filtering out heavy metals, and a plurality of inspection/maintenance risers attached to and extending upwardly from said stormwater pollutant separator.

10. The stormwater pollutant separator according to claim 9 wherein said chamber comprises a first section, a second section, and a third section, said first section being located between said first end and said weir plate, said second section being located between said weir plate and said siphon plate, said third section being located between said siphon plate and said second end, said first section being of a length greater than the length of said second section.

11. The stormwater pollutant separator according to claim 10 wherein said first section has one of said inspection/maintenance risers connected thereto and extending upwardly therefrom, and said second section has one of said inspection/maintenance risers connected thereto and extending upwardly therefrom.

12. The stormwater pollutant separator according to claim 11 wherein said third section has one of said access risers connected thereto and extending upwardly therefrom, said third section having filter material placed intermediate said siphon plate and said second end, said filter material being adjacent said outflow aperture.

13. The stormwater pollutant separator according to claim 9 wherein said filter material is suspended within said chamber from the top of said chamber.

14. A stormwater pollutant separator comprising a chamber, said chamber having a top, and a bottom, a first end and a second end, said first end having an intake aperture formed therein, said second end having an outflow aperture formed therein, a weir plate attached to and extending upwardly from said chamber bottom, a siphon plate attached to and extending downwardly from said chamber top, and a plurality of inspection/maintenance risers attached to and extending upwardly from said stormwater pollutant separator, said chamber comprising a first section, a second section, and a third section, said first section being located between said first end and said weir plate, said second section being located between said weir plate and said siphon plate, said third section being located between said siphon plate and said second end, said first section having one of said inspection/maintenance risers connected thereto and extending upwardly therefrom, said second section having one of said inspection/maintenance risers connected thereto and extending upwardly therefrom, and said third section having one of said access risers connected thereto and extending upwardly therefrom, said third section having filter material placed intermediate said siphon plate and said second end, said filter material being adjacent said outflow aperture, said third section having a standpipe, said standpipe having a top and a bottom, said standpipe top attached to and extending downwardly from said chamber top, said standpipe having a plurality of apertures formed therein, said filter material placed within said standpipe.

15. The stormwater pollutant separator according to claim 14 wherein said standpipe has an end plate attached at said standpipe bottom, said standpipe end plate having apertures formed therein.

16. A stormwater pollutant separator system, comprising a stormwater pollutant separator having a first end and a second end, said stormwater pollutant separator comprising a chamber, said chamber having a top and a bottom, a weir plate attached to and extending upwardly from said chamber bottom, said weir plate extending completely across said chamber at a height less than the height of said chamber, a plurality of access risers attached to and extending upwardly from said stormwater pollutant separator, said first end having an intake aperture formed therein, said second end having an outflow aperture formed therein, filter material being inside said chamber adjacent said outflow aperture, said filter material filtering out heavy metals, a by-pass system having a first end and a second end, an intake conduit connecting said first end of said stormwater pollutant separator and said first end of said by-pass system, and an outflow conduit connecting said second end of said stormwater pollutant separator and said second end of said by-pass system.

17. The stormwater pollutant separator system according to claim 16 wherein said by-pass system includes a by-pass conduit and a by-pass connector, said by-pass connector attached to said by-pass conduit and to said outflow conduit.

18. The stormwater pollutant separator system according to claim 16 wherein said filter material is suspended within said chamber from the top of said chamber.

19. A method for separating floating and non-floating material from stormwater drainage, comprising the steps of:

inducing said stormwater drainage initially into a stormwater pollutant separator for flow therethrough;

containing the majority of all non-floating material by the use of a weir plate within said stormwater pollution separator; said weir plate extending completely across said stormwater pollution separator at a height less than the height of said stormwater pollution separator.

containing the majority of all floating material within said stormwater pollution separator;

discharging said stormwater drainage from said stormwater pollutant separator;

providing a by-pass system for introduction of stormwater drainage thereinto for flow therethrough when the level of stormwater drainage awaiting introduction into said stormwater pollutant separator results in overflow into said by-pass system; and discharging any stormwater drainage from said by-pass system into the stormwater drainage discharged from the stormwater pollutant separator.

20. The method according to claim 19 which includes the additional step of removing at least some of the heavy metals, phosphates, and nitrates in said stormwater drainage by introducing a filtering material within said stormwater pollutant separator prior to the discharge of said stormwater drainage from said stormwater pollutant separator.

21. The method according to claim 19 wherein said stormwater pollutant separator has an outlet aperture sized to regulate the rate of flow of said stormwater drainage through said stormwater pollutant separator.

22. The method according claim 19 which includes the additional step of removing at least some of the heavy metals, phosphates, and nitrates in said stormwater drainage prior to the discharge of said stormwater drainage from said stormwater pollutant separator using a filter material.

* * * * *